Oct. 29, 1940. L. REICHOLD Re. 21,611

ELECTRIC SADIRON

Original Filed April 13, 1937 2 Sheets-Sheet 1

INVENTOR
Ludwig Reichold
BY Brown + Jones
ATTORNEYS

ELECTRIC SADIRON

Original Filed April 13, 1937 2 Sheets-Sheet 2

INVENTOR
Ludwig Reichold
BY Brown & Jones
ATTORNEYS

Reissued Oct. 29, 1940

Re. 21,611

UNITED STATES PATENT OFFICE 21,611

ELECTRIC SADIRON

Ludwig Reichold, Winsted, Conn., assignor to The Winsted Hardware Manufacturing Company, Winsted, Conn., a corporation of Connecticut Original No. 2,119,964, dated June 7, 1938, Serial No. 136,615, April 13, 1937. Application for reissue June 6, 1940, Serial No. 339,203

29 Claims. (Cl. 219—25)

This invention relates to improvements in electric flatirons or sadirons, and more particularly to a folding electric sadiron having a handle hinged to the cover of the sole plate, which handle is adapted to be swung down parallel with said sole plate into compact form to facilitate the storage and transportation of the iron.

One object of the invention is to provide a folding electric sadiron of the above nature in which the sole plate casing has a pair of upstanding hinge sockets which not only form a support for the handle, but also serve to connect the cover to the sole plate.

Another object is to provide an electric sadiron of the above nature having a unitary heel rest, plug guard, and handle lock which is adapted to be secured to the rear of the casing.

A further object is to provide a folding sadiron of the above nature which will be relatively simple in construction, consist of only a small number of parts, be inexpensive to manufacture, easy to assemble and manipulate, compact, light in weight, ornamental in appearance, and very efficient and durable in use.

With these and other objects in view, there have been illustrated on the accompanying drawings several forms in which the invention may be conveniently embodied in practice.

Figure 5:
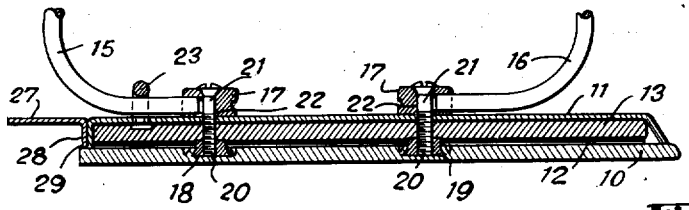
Fig. 5 is a fragmentary enlarged sectional view taken on the line 5—5 of Fig. 2, and showing the bearing posts which serve as hinges for the handle and the screws which connect said handle and the cover to the sole plate.

Referring now to the drawings in which like reference numerals denote corresponding parts throughout the several views, the numeral 10 indicates a sole plate, preferably made by stamping from flat sheet metal in a suitable press. Mounted upon the sole plate 10 is a shallow cover casing 11 which encloses (see Fig. 5) a thin insulated heating element 12 of standard form resting directly upon the sole plate 10, and a thick filler block 13 of compressible insulating material, such as asbestos or the like. A handle 14, preferably of wood, is also provided and has a pair of opposed cylindrical wire bail members 15 and 16 rigidly embedded in its ends, said bail members being convex outwardly and having horizontal inwardly extending lower ends journaled in a pair of cylindrical upstanding bearing posts 17 which are spaced apart and located adjacent the ends of the cover casing 11.

In order to detachably secure the handle bail members 15 and 16 and the casing cover 11 to the sole plate 10, provision is made of a pair of longitudinally spaced-apart headed lugs 18 and 19 which are rigidly secured permanently in recesses formed in the upper surface of the sole plate 10 and in alinement with the bearing posts 17. As clearly shown in Fig. 5, each of the lugs 18 and 19 is provided with a tapped hole 20 for receiving a corresponding pair of headed screws 21. The screws 21 pass upwardly through alined vertical apertures in the heating element 12, the insulating filler block 13, and the cover casing, and then through suitable holes 22 provided in the posts 17.

By means of this construction, when the screws 21 are tightened, the heating element 12, the filler block 13 and the posts 17 will be clamped tightly to the sole plate 10. To more rigidly support the handle the rear bail member 15 is embraced by a short U-shaped loop member 23 having its ends riveted over upon the under surface of the cover casing 11.

In order to conduct current to the heating element 12, a pair of slightly inclined terminal prongs 24 extend upwardly through an inclined boss 25 (see Figs. 1 and 2), struck up from the casing 11, said prongs being adapted to receive a plug 26 of the standard type generally employed with appliances of this nature. A unitary one-piece plug guard, heel rest, and handle lock support is provided at the rear of the cover casing 11 and is preferably stamped and formed from sheet metal. As most clearly shown in Figs. 1–4 inclusive, this unitary member is shown as having a horizontally disposed flat heel rest plate 27 which serves to support the sadiron when tilted up, as shown by the dash line 57 of Fig. 1, when out of use. Extending from the heel rest are a pair of depending flanges 28 which are adapted to be secured to the rear edge portion 29 of the casing 11 as by spot welding. A tongue 30 extends upwardly from the plate 27 and is rearwardly inclined parallel to the prongs 24 to form a support for an oval-shaped plug guard 31 which is shaped to fit loosely about the plug 26. The end 32 of the plug guard 31 is bent transversely along the tongue 30 to which it may be connected, as by spot welding. Extending rearwardly from the tongue 30 is a catch hook 33 having a slot 34 at one end adapted to partially embrace the bail member 15, and serving to limit the movement of the handle 14 when it is swung upwardly from its folded position shown in dotted lines into its vertical ironing position, as shown in full lines in Figs. 1–3.

In order to securely lock the bail member 15 within the slot 34 of the catch hook 33, a pivoted latch member 35 is provided which is preferably stamped from sheet metal and has one of its ends formed into a hook 36 which is adapted to embrace the bail member 15 and lock it in the slot 34. The other end of the latch member 35 is provided with a short upstanding handle lug 37 for facilitating the swinging of the latch member 25 about a pivot pin 38 which pivotally secures said member 25 to the catch hook 33.

Figure 2:
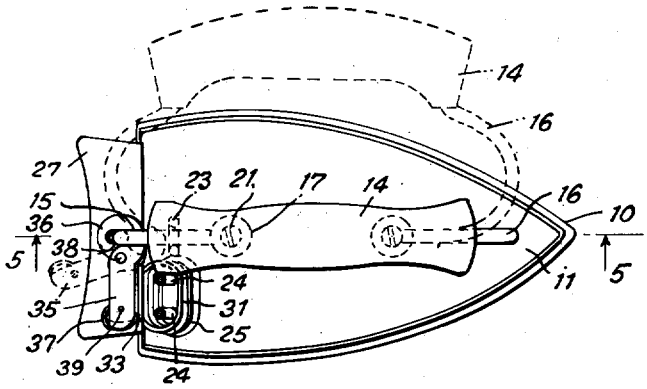
Fig. 2 is a top plan view of the same.

The latch member 35 is provided with a depressed knob 39 which is adapted to snap into a hole 40 provided in the catch hook 33 to frictionally hold the latch lever member 35 in the handle locking position shown in Fig. 2. The catch hook 33 is spaced upwardly from the cover casing 11 sufficiently to cause the latch member 35 to engage the bail member 15 adjacent the center of its convex portion so as to insure that the handle 14 will be rigidly supported and locked in its vertical operative position.

Figure 6:
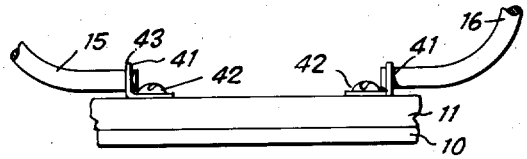
Figs. 6 and 7 are fragmentary side and end views respectively of a modified form of handle hinging structure.
Figure 7:
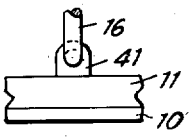

The modified form of the invention shown in Figs. 6 and 7 illustrates a hinge connection for a folding sadiron handle constituted by a pair of opposed angle plates 41 which are secured to the casing 11, as screws 42, which pass through the horizontally disposed legs of said angle plates 41, and securely clamp the cover casing 11, the filler block 13 and the heating element 12 to the sole plate 10. The vertically disposed legs of the angle plates 41 are each provided with an opening 43 in which the horizontal bail members 15 and 16 respectively are journaled.

Figure 8:
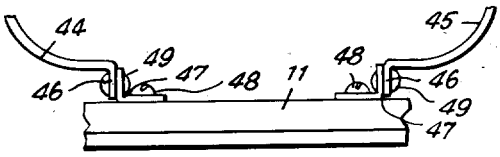
Figs. 8 and 9 are fragmentary side and end views respectively of another modified form of handle hinging structure.
Figure 9:
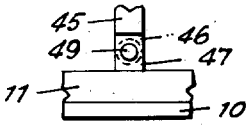

In the modified form shown in Figs. 8 and 9, the bail members 44 and 45 are formed of flat strip stock and are vertically bent at their lower ends 46 to abut against the vertical legs of a pair of angle plates 47. The horizontal legs of the angle plates 47 are secured to the casing 11 by screws 48 which perform the same functions as the screws 21 and 42 in the first two forms of clamping together the sole plate 10, the heating element 12, the filler block 13 and the cover casing 11. The lower ends 46 of the bail members 44 and 45 are pivotally secured to the vertical legs of the angle plates 47 by rivets 49.

Figure 10:
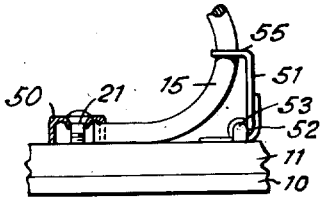
Fig. 10 is a fragmentary side view showing a modified form of bearing post and a modified lock for holding the handle in ironing position.
Figure 11:
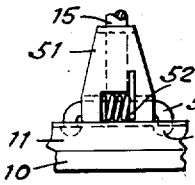
Fig. 11 is an end view of the same.
Figure 12:
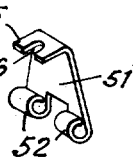
Fig. 12 is a perspective view of the pivoted locking plate member of the handle lock illustrated in Figs. 10 and 11.

The modified form of bearing post 50 shown in Fig. 10 is hollow instead of being solid as the bearing post 17 of the first form, being formed by stamping from sheet metal. The modified form of handle locking device also shown in Figs. 10, 11 and 12 comprises a tapered spring-pressed catch plate 51 which is formed of sheet metal. One end of the catch plate 51 has a cylindrical end portion 52 wrapped about a U-shaped transverse bar 53, the ends of which are down-turned and riveted to the cover casing 11, as at 54. The catch plate 51 extends upwardly from the portion 52 and has a horizontal flange 55 extending therefrom toward the bail member 15. The flange 55 is provided with a slot 56 shaped to frictionally embrace the cylindrical bail member 15 when the latter is in the operative position shown in Fig. 10 with the bail member 15 straddled by the flange 55.

*Operation*

Figure 1:
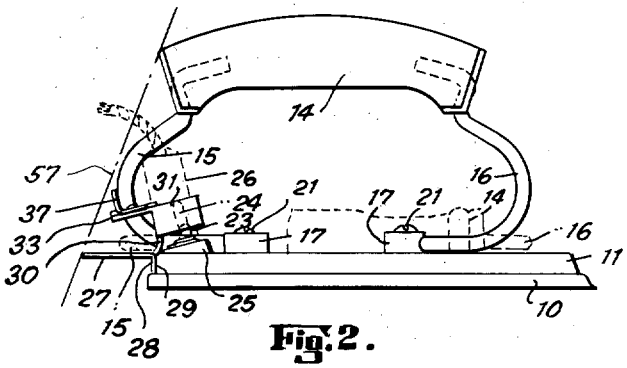
Fig. 1 is a side view in elevation of an electric sadiron embodying the features of this invention.
Figure 3:
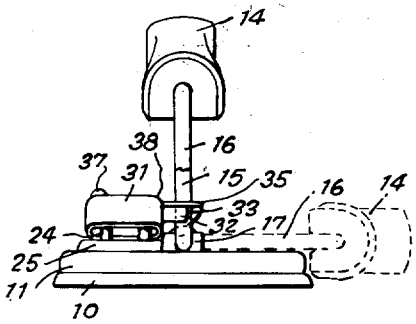
Fig. 3 is an end view of the same.
Figure 4:
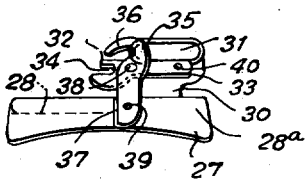
Fig. 4 is a perspective view of the unitary heel rest, plug guard, and handle lock.

The present folding sadiron is particularly adapted for the use of travelers since it may be collapsed into a small space, as shown in dotted lines in Figs. 1–3. In folded condition, the device may be readily and conveniently slipped into a bag-like container and packed in a traveling bag or in a small shipping container, not shown.

When it is desired to use the folding iron, it will first be removed from its container, and the handle 14 will be swung upwardly as far as it will go into vertical or operative position, as shown in full lines in Figs. 1–3. The pivoted latch member 35 will then be moved from the dotted line position shown in Fig. 2 into the full line position to securely lock the handle in vertical operating position. When the user has finished ironing, the latch member 35 will be swung back to its unlocked position shown in Fig. 4, releasing the handle 14, and permitting it to be again swung down upon the cover casing 11 and the iron to be stored away.

While there have been disclosed in this specification several forms in which the features of this invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a folding electric sadiron, a sole plate, a heating element resting thereon, a thick compressible filler block resting on said heating element, a hollow cover casing embracing said filler block and having its edge in abutment with the edge of said sole plate, a loop-shaped handle having inwardly extending horizontal bottom hinge sections, a pair of bearing posts for said hinge sections, and screw means for securing said posts to said casing and clamping said casing to said sole plate with said filler block compressed therebetween.

2. In a folding electric sadiron, a sole plate, a flat heating element resting thereon, a compressible filler block resting upon said heating element, a hollow cover casing embracing said filler block, a handle having an upper heat insulated grip section and a pair of lower inturned hinge bail members, a pair of bearing posts for said bail members resting on said casing, and a pair of headed screws passing down through said bearing posts and having their lower ends screwed into the upper surface of said sole plate.

3. In a folding electric sadiron, a sole plate, a heating unit resting thereon, a filler block on said heating unit, a hollow cover casing enclosing said unit and said filler block, a pair of posts upstanding from said casing, a loop-shaped

BEST AVAILABLE COPY handle having its lower ends hinged to said posts on a horizontal axis, and means passing vertically through said posts, said filler block and said heating unit, and having interlocking engagement with said sole plate to securely clamp said casing in operating position upon said sole plate.

4. In a folding electric sadiron, a sole plate, a shallow inverted dish-shaped cover therefor, a heat insulated substantially horizontal handle grip spaced from said cover, a pair of hinge posts upstanding from said cover, a pair of outwardly convex semi-U-shaped bail members having their upper legs embodied in the ends of said handle grip, the lower legs of said bail members being pivotally mounted in said posts on a longitudinal axis, and a pair of headed clamping screws for passing through said posts and said cover and threadedly connected with said sole plate.

5. In a folding electric sadiron, a sole plate, a cover casing resting thereon, a loop-shaped handle hinged on a horizontal longitudinal axis to said cover casing and being swingable down close to said casing into compact form, a releasable locking plate secured to said cover casing for engaging a section of said handle intermediate the upper and lower sections thereof for holding it in vertical ironing position.

6. In a folding electric sadiron, a sole plate, a cover casing resting thereon, a loop-shaped handle hinged on a horizontal longitudinal axis to said cover casing and being swingable down close to said casing into compact form, and a releasable locking plate hinged to said cover casing for engaging a section of said handle intermediate the upper and lower sections thereof for holding it in vertical ironing position.

7. In a folding electric sadiron, a sole plate, a heating unit resting thereon, a filler block on said heating unit, a hollow cover casing enclosing said unit and said filler block, a pair of hollow posts upstanding from said casing, a loop-shaped handle having its lower ends hinged to said posts on a horizontal axis and being swingable down close to said casing into compact form, and means passing vertically through said posts, said filler block and said heating unit, and having interlocking engagement with said sole plate to securely clamp said casing in operating position upon said sole plate.

8. In a folding electric sadiron, a sole plate, a casing for covering said sole plate, a pair of longitudinally spaced angle-shaped posts secured to said casing, a loop-shaped handle having a heat insulating grip section and a pair of depending bail sections pivotally secured to the vertical sections of said angle posts, said handle being swingable down into close proximity with said casing to form a compact unit, and screws passing through the horizontal sections of said posts and threadedly connected to said sole plate.

9. In a folding electric sadiron, a sole plate, a casing for covering said sole plate, a loop-shaped handle member hinged to said casing, a pair of insulated terminal prongs extending from said casing for receiving a current supply plug, a guard member surrounding said terminal prongs, said guard member having means to hold said handle in vertical ironing position and also having a rearwardly extending heel rest to support said sadiron when in tipped-up position.

10. In a folding electric sadiron, a sole plate, a casing for covering said sole plate, a loop-shaped handle member hinged to said casing, a pair of insulated terminal prongs extending from said casing for receiving a current supply plug, a guard member surrounding said terminal prongs, said guard member having means to hold said handle in vertical ironing position and also having a rearwardly extending heel rest to support said sadiron when in tipped-up position, and means for rigidly securing said guard member to the rear of said casing.

11. In a folding electric sadiron, a sole plate, a casing for covering said sole plate, a loop-shaped handle member hinged to said casing, a pair of insulated terminal prongs extending from said casing for receiving a current supply plug, a guard member surrounding said terminal prongs, said guard member having a hook-shaped latch member pivoted thereto to releasably embrace said handle to hold it in vertical ironing position and also having a rearwardly extending heel rest to support said sadiron when in tipped-up position.

12. In an electric sadiron, a casing having a pair of terminal prongs extending therefrom and adapted to receive a current supply plug, a handle having horizontal inturned alined bail ends hingedly secured to said casing on a horizontal axis, a guard secured to said casing surrounding said prongs, said guard having a catch flange extending therefrom into the path of the movement of one of said bails to detachably hold said handle in vertical position, and a latch pivoted to said flange to lock said bail in upright ironing position.

13. In a folding electric sadiron, a sole plate, a flat heating element resting thereon, a compressible filler block resting upon said heating element, a hollow cover casing embracing said filler block, a handle having an upper heat insulated grip section and a pair of lower inturned hinge bail members, a pair of bearing posts for said bail members resting on said casing, a pair of headed screws passing down through said bearing posts and having their lower ends screwed into the upper urface of said sole plate, and means for releasably holding said handle in upright ironing position.

14. In a folding electric sadiron, a sole plate, a heating unit resting thereon, a filler block on said heating unit, a hollow cover casing enclosing said unit and said filler block, a pair of posts upstanding from said casing, a loop-shaped handle having its lower ends hinged to said posts on a horizontal axis, means passing vertically through said posts, said filler block and said heating unit and having interlocking engagement with said sole plate to securely clamp said casing in operating position upon said sole plate, and means to releasably lock said handle in upright ironing position.

15. In a folding electric sadiron, a sole plate, a heating element resting thereon, a filler block for holding said heating element in tight contact with said sole plate, a loop-shaped handle having a pair of lower inturned alined hinge bail members, and a pair of bearing posts for connecting said bail members to said sole plate, said handle being hinged on a longitudinal axis close to said sole plate and adapted to be swung down parallel and close to said sole plate.

16. In a folding electric sadiron, a sole plate having a pair of upstanding posts, and a loop-shaped handle having a pair of inturned alined bails hinged to said posts, said handle being adapted to be swung down about a longitudinal axis into parallelism and into close proximity

BEST AVAILABLE COPY with said sole plate, and means to releasably hold said handle in vertical ironing position.

17. In a folding electric sadiron, a sole plate, filler means, a heating element between said plate and said filler means, a hollow cover casing embracing said filler means and having its edge in abutment with said plate, a generally loop-shaped handle having bottom hinge sections, said sections extending in directions having a direction component parallel to said plate, a pair of bearing posts for said sections, and screw means for securing said posts to said casing and clamping said casing to said plate with said filler means therebetween.

18. In a folding electric sadiron, a sole plate, filler means, a heating element between said plate and said filler means, a hollow cover casing embracing said filler means, a handle having an upper heat-insulated grip section and a pair of lower, hinge, bail members, a pair of bearing posts for said bail members and resting on said casing, and a pair of screws passing through said bearing posts and having their lower ends screwedly connected with the upper surface of said sole plate.

19. In a folding electric sadiron, a sole plate, filler means, a heating unit in proximity to said sole plate, a hollow cover casing enclosing said unit and said filler block, a pair of posts upstanding from said casing, a generally loop-shaped handle having its lower ends hinged to said posts, and means passing through said posts, said filler means and said heating unit and having interlocking engagement with said sole plate to clamp securely said casing in operating position with respect to said sole plate.

20. In a folding electric sadiron, a sole plate, a shallow inverted dish-shaped cover therefor, a heat insulated substantially horizontal handle grip spaced from said cover, a pair of hinge posts upstanding from said cover, a pair of outwardly convex semi-U-shaped bail members having their upper legs embodied in the ends of said handle grip, the lower legs of said bail members being pivotally mounted in said posts, and a pair of clamping screws for passing through said posts and said cover and threadedly connected with said sole plate.

21. In a folding electric sadiron, a sole plate, a cover casing resting thereon, a loop-shaped handle hinged to said cover casing and being swingable down close to said casing into compact form, a releasable locking plate connected to said cover casing for engaging a section of said handle intermediate the upper and lower sections thereof for holding it in vertical ironing position.

22. In a folding electric sadiron, a sole plate, a cover casing resting thereon, a loop-shaped handle hinged to said cover casing and being swingable down close to said casing into compact form, a releasable locking plate hingedly connected to said cover casing for engaging a section of said handle intermediate the upper and lower sections thereof for holding it in vertical ironing position.

23. In a folding electric sadiron, a sole plate, a cover casing resting thereon, a loop-shaped handle hinged to said cover casing and being swingable down close to said casing into compact form, a releasable locking plate slidably connected to said cover casing for engaging a section of said handle intermediate the upper and lower sections thereof for holding it in vertical ironing position.

24. In a folding electric sadiron, a sole plate, filler means, a heating unit in proximity to said sole plate, a hollow cover casing enclosing said unit and said filler block, a pair of hollow posts upstanding from said casing, a generally loop-shaped handle having its lower ends hinged to said posts and being swingable down close to said casing into compact form, and means passing through said posts, said filler means and said heating unit and having interlocking engagement with said sole plate to clamp securely said casing in operating position with respect to said sole plate.

25. In a folding electric sadiron, a sole plate, a cover casing resting thereon, a loop-shaped handle hinged to said cover casing and being swingable down close to said casing into compact form, a guard member associated with said casing and adapted to guard an electrical connection for said sadiron, and releasable means connected to said guard member for engaging a section of said handle for holding it in ironing position.

26. In a folding electric sadiron, a sole plate, filler means, a heating element between said plate and said filler means, a hollow cover casing embracing said filler means, a handle having an upper heat-insulated grip section and a pair of lower, hinge, bail members, a pair of bearing posts for said bail members and resting on said casing, a pair of screws passing through said bearing posts and having their lower ends screwedly connected with the upper surface of said sole plate, and means for releasably holding said handle in ironing position.

27. In a folding electric sadiron, a sole plate, filler means, a heating unit in proximity to said sole plate, a hollow cover casing enclosing said unit and said filler block, a pair of posts upstanding from said casing, a generally loop-shaped handle having its lower ends hinged to said posts, means passing through said posts, said filler means and said heating unit and having interlocking engagement with said sole plate to clamp securely said casing in operating position with respect to said sole plate, and means for releasably holding said handle in ironing position.

28. In a folding electric sadiron, a sole plate, a heating element, filler means for holding said heating element in proximity to said plate, a loop-shaped handle having a pair of lower hinge bail members, and a pair of bearing posts for connecting said bail members to said sole plate, said handle being hinged close to said sole plate and adapted to be swung down close to said sole plate.

29. In a folding electric sadiron, a sole plate having a pair of upstanding posts, and a loop-shaped handle having a pair of bails hinged to said posts, said handle being adapted to be swung down about a longitudinal axis into close proximity with said sole plate, and means to releasably hold said handle in ironing position.

LUDWIG REICHOLD.